United States Patent [19]

McNally et al.

[11] 4,033,185
[45] July 5, 1977

[54] WIND-TUNNEL SIMULATOR

[75] Inventors: Thomas J. McNally, Levittown, Pa.;
Sigfried Mehling, Emmelshausen, Hunsruck, Germany; Walter J. Puchalski, Southampton, Pa.

[73] Assignee: The United States of America as represented by the Secretary of the Army, Washington, D.C.

[22] Filed: May 18, 1976

[21] Appl. No.: 687,577

[52] U.S. Cl. .................................. 73/147; 73/167; 73/432 SD

[51] Int. Cl.² .......................................... G01M 9/00

[58] Field of Search ............. 73/147, 167, 432 SD, 73/86

[56] References Cited

UNITED STATES PATENTS

| | | | |
|---|---|---|---|
| 3,029,635 | 4/1962 | Fetz | 73/147 |
| 3,960,000 | 6/1976 | Barnett et al. | 73/167 |

FOREIGN PATENTS OR APPLICATIONS 783,046   9/1957   United Kingdom .................. 73/147

*Primary Examiner*—Donald O. Woodiel
*Attorney, Agent, or Firm*—Nathan Edelberg; Robert P. Gibson; Arthur I. Spechler

[57] ABSTRACT

A novel wind-tunnel simulator produces a flow of a gas over a spinning tracer projectile to simulate the flame shape from the tracer projectile as though in actual flight. The wind-tunnel simulator comprises a fixture formed with an opening for receiving the tracer projectile therein spaced from the surface that defines the opening. The fixture is fixed to a motor which is coupled to the projectile for spinning it as though in actual flight. Gas is forced through passageways, formed in the fixture, that communicate with the opening, whereby the gas can flow over the spinning, burning, tracer projectile to simulate in-flight conditions.

7 Claims, 4 Drawing Figures

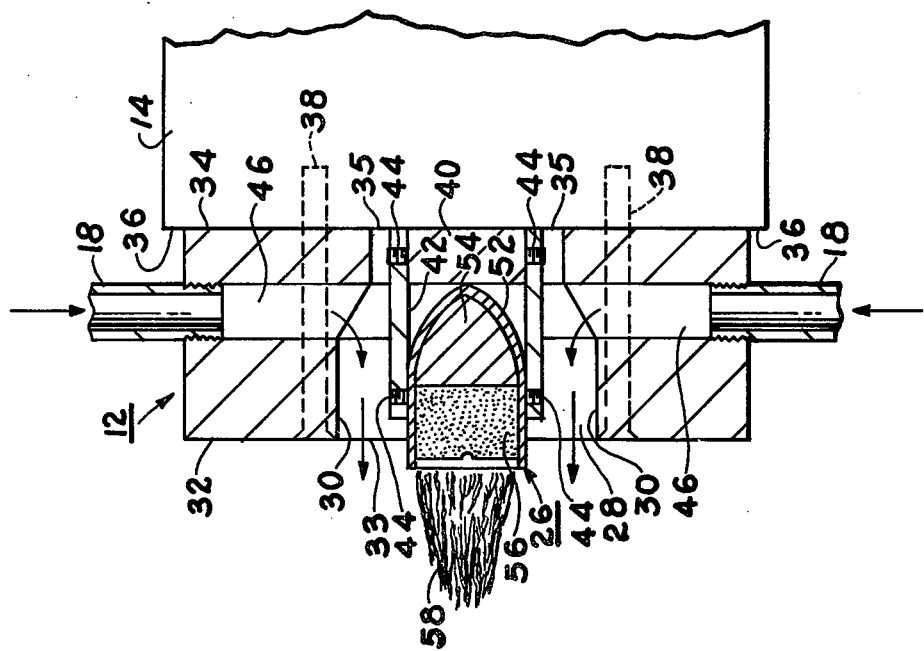
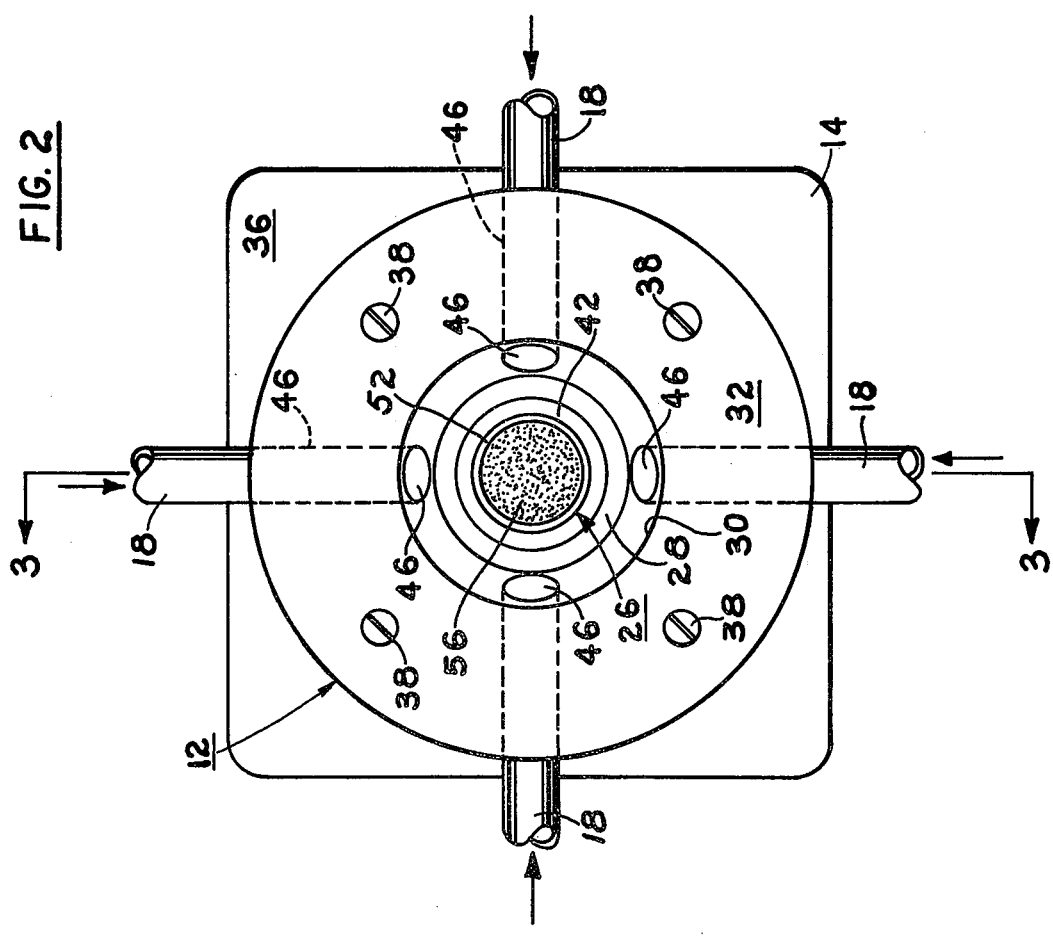

WIND-TUNNEL SIMULATOR

The invention described herein may be manufactured and used by or for the United States Government for governmental purposes without the payment to us of any royalties thereon.

This invention relates generally to a wind-tunnel simulator. More particularly, the invention relates to a wind-tunnel simulator for producing, about an object having zero linear velocity, a flow of a gas which simulates the flow of the gas over the object as though the latter were projected through the gas. The novel wind-tunnel simulator is particularly useful for observing, in the laboratory, the flame shape of a projectile, such as a tracer bullet, for example, under simulated in-flight conditions.

It has been proposed to study the flame shape and interaction of the air with the flame of a tracer projectile under in-flight conditions by igniting the pyrotechnic mixture of the projectile in a wind-tunnel. In many laboratories, however, access to a wind tunnel is not convenient. Also, the cost of building and maintaining a conventional wind tunnel, is relatively high, and its use must usually be scheduled in advance. The novel wind-tunnel simulator of the present invention eliminates the need for a conventional wind tunnel by providing relatively low-cost apparatus for observing the simulated in-flight characteristics of projectiles.

Briefly stated, in one embodiment the novel wind-tunnel simulator comprises a fixture formed with an opening to receive an object to be studied spaced from the surface that defines the opening. Conduit means are provided to supply a flow of a gas over the object and through one end of the opening, whereby to simulate in-flight conditions of the object in the gas.

In another embodiment of the novel wind-tunnel simulator, means are provided to spin the object about an axis thereof while completely restricting any linear velocity thereto.

In still another embodiment of the novel wind-tunnel simulator, means are provided to vary the space between the object, under observation, and the contour of the surface that defines the opening in the fixture so as to vary the velocity of the gas over the object.

The novel features of the present invention are set forth with particularity in the appended claims. The invention itself, however, both as to its organization and method of operation, together with its objects and advantages may best be understood by reference to the following description, taken in conjunction with the following drawings, in which similar parts have the same reference designations, and in which:

FIG. 2 is an enlarged, fragmentary, front elevational view of the wind-tunnel simulator, showing a fixture thereof taken along the line 2—2 in FIG. 1;

FIG. 3 is a fragmentary cross-sectional view of the fixture taken along the line 3—3 in FIG. 2.

Figure 1:
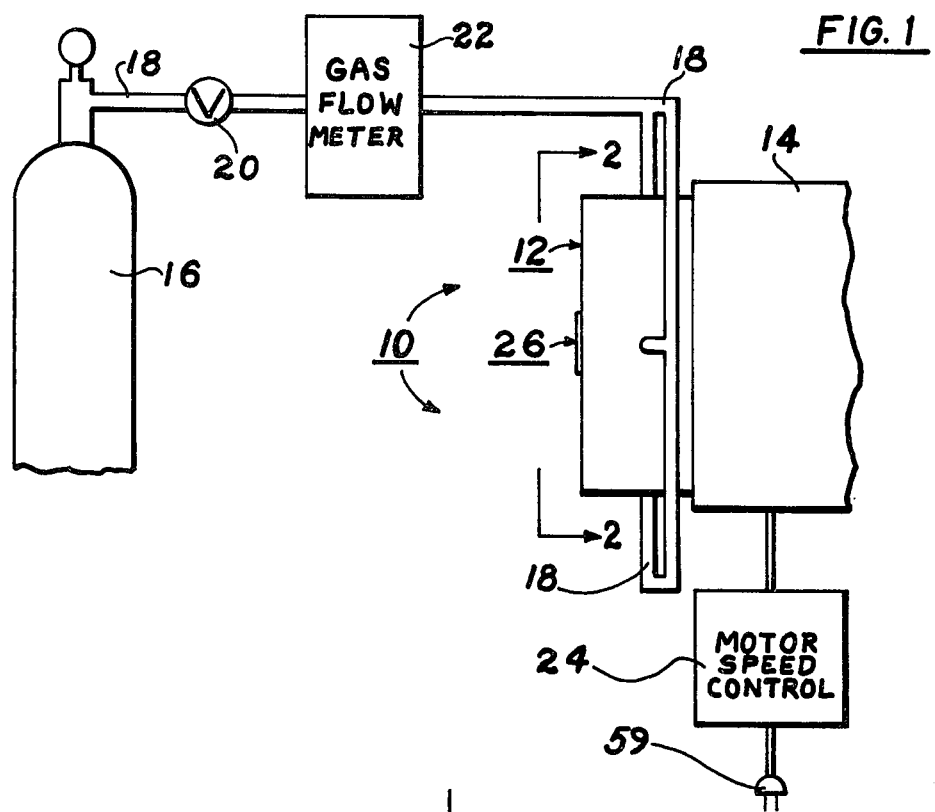
FIG. 1 is a fragmentary, side elevational view, partly schematic, of one embodiment of the novel wind-tunnel simulator in an arrangement for observing a projectile containing a pyrotechnic charge.

Referring now to FIG. 1 of the drawing, there is shown an arrangement of a wind-tunnel simulator 10 comprising a fixture 12, to be described hereinafter in detail, an electric motor 14 fixed to the fixture 12, and a source of a gas, such as a tank 16 of the gas under pressure. The gas is supplied from the tank 16 to the fixture 12 via conduit means comprising a conduit 18, a valve 20, and a gas flow meter 22. A motor speed control 24 is connected to the motor 14 to vary its speed between zero and about 150,000 rpm for the purpose hereinafter appearing.

A projectile 26, such as a fumer or tracer projectile, for example, to be observed in the novel wind-tunnel simulator under simulated in-flight conditions, is disposed within a central opening 28, of the fixture 12, as shown in FIGS. 2 and 3. The fixture 12 is preferably of metal, such as aluminum or steel, for example. The projectile 26 is spaced from the cylindrically-shaped inner surface 30, of the fixture 12, that defines the opening 28. The opening 28 extends between two opposite, parallel, planar side walls 32 and 43 of the fixture 12, and has ends 33 and 35 in each, respectively. The planar side wall 34 is disposed against a planar wall 36 of the motor 14, and the fixture 12 is fastened to the motor 14 by any suitable means, such as screws 38. Thus, the end 35 of the opening 28 is closed to prevent gases emitting therethrough.

Means are provided to spin the projectile 26 about an axis thereof without imparting any linear velocity thereto. To this end, the projectile 26 is secured to a rotatable shaft 40 (FIG. 3) of the motor 14 by any suitable means, such as, for example, a suitable chuck or a sleeve 42. The sleeve 42 is secured to the shaft 40 and to the projectile 26 by set screws 44, as shown, or by any other suitable means.

Conduit means are provided to direct the gas from the tank 16 (FIG. 1) over the projectile 26 to simulate the flow of the gas under in-flight conditions. To this end, a plurality of passageways 46 are formed in the fixture 12, transversely to the opening 28 and communicating therewith, as shown in FIGS. 2 and 3. While four passageways 46 are illustrated, the fixture 12 may be formed with as many as necessary to provide an adequate flow of the gas over the projectile 26. The conduit 18 is connected to each of the passageways 46, and the velocity of the gas supplied to the fixture 12 is controlled by the valve 20, and the shape of the heretofore described opening 28, and monitored by the gas flow meter 22. The arrows associated with the conduit 18, the passageways 46, and the opening 28 indicate the direction of the flow of gas therethrough.

The operation of the novel wind-tunnel simulator 10 will be described with the aid of a tracer bullet, as the projectile 26, under simulated in-flight conditions. The tracer bullet, projectile 26, comprises an open-ended jacket 52 of a metal, such as copper, for example. The jacket 52 is the ogive portion of the projectile, that is, the portion of the bullet less the usual brass casing. A slug 54 of a metal, such as lead, for example, is within the pointed end of the jacket 52, and a pyrotechnic (tracer) mixture 56 of luminously burning chemicals, such as, for example, magnesium and strontium nitrate, well known in the art, is packed in, behind the slug 54, through the open-end of the jacket 52, as shown in FIG. 3. When the mixture 56 is ignited, a resultant flame 58 is directed outwardly, away from the open end 33 of the opening 28 and away from the fixture 12, as shown in FIG. 3.

The operation of the novel wind-tunnel simulator, illustrated in FIGS. 1, 2, and 3 will now be explained. Let it be assumed that it is desired to observe, and/or study, in the laboratory, the flame shape or the gas-flow interaction with the flame of the tracer bullet (projectile 26) under simulated in-flight conditions. The motor 14 is energized by connecting plug 59 (FIG. 1) to a suitable source of electrical energy (not shown). The motor speed control 24 is adjusted to provide the now spinning projectile 26 to simulate the rotational speeds experienced in actual flight, say about 100,000 rpm. The rpm can be controlled from zero to about 150,000 rpm by the motor speed control 24. The pyrotechnic mixture 54 is now ignited, and gas from the tank 16 is supplied to the fixture 12, by means of the valve 20 while monitoring its flow by observing the gas flowmeter 22. The velocity of the gas flow can be controlled from zero to almost Mach 1 with the apparatus shown in FIGS. 2 and 3. The gas now flows serially through the conduit 18, the passageways 46 of the fixture 12, the opening 28, over the ignited tracer bullet (projectile 26), and out through the open end 33 of the opening 28. Thus, the gas, if air, flowing over the rotating tracer bullet closely approximates the actual environmental conditions experienced by a fired tracer projectile. Hence, under these simulated in-flight conditions, the flame 58 of the projectile 26 can be observed, measured, and tested in the laboratory. The flame 58 can be tested in the presence of different gases by supplying these gases from the tank 16. Thus, the gases may be, but not limited to, oxygen, nitrogen, air, and mixtures of different concentrations thereof to simulate different atmospheric environments.

A non-pyrotechnic projectile 26 may also be observed and tested with the novel wind-tunnel simulator 10, by providing a visible gas, such as air or nitrogen containing a visible aerosol. Aerosols of oil, smoke, and the visible gaseous materials used in conventional large wind tunnels, and known in the art, may also be used.

Figure 4:
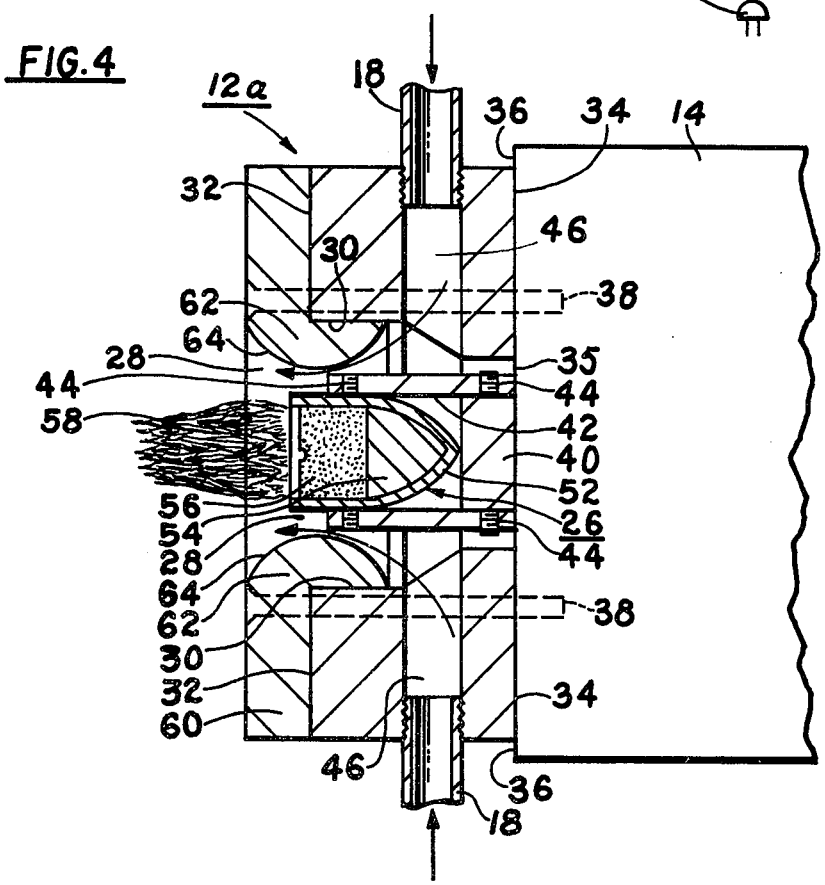
FIG. 4 is a cross-sectional view, similar to that of FIG. 3, and showing another embodiment of the fixture for obtaining a gas flow of greater than Mach 1 over an object under observation.

Referring now to FIG. 4, there is shown a fixture 12a which is a modification of the fixture 12, for simulating speeds of projectiles 26 in excess of Mach 1 in a gas. The principal difference between the fixtures 12a and 12 is that the inner surface that defines the opening 28 is convexly curved towards the projectile 26 in the fixture 12a rather than parallel to the projectile 26 as in the fixture 12. To achieve this structure in the fixture 12a, an annular member 60 formed with a flange 62 of somewhat arcuate cross section is fixed to the side wall 32 by the screws 38. The flange 62 extends into the opening 28 to decrease its space; and the convex rounded surface 64 (FIG. 4) of the flange 62 provides a venturi structure and action between it and the projectile 26. In the fixture 12a the rounded surface 64 now defines a portion of the central opening 28. Thus, a gas under pressure that is introduced into the passageways 46 flows into the opening 28 and over the restricted (narrowed) venturi structure provided between the rounded surface 64 and the projectile 26. In passing through the venturi the speed of the gas is increased, by Venturi principles well known in the art, and speeds in excess of March 1 can be obtained over a spinning, burning tracer projectile 26. In accordance with the present invention, the annular members 60 with different size flanges 62 and different convex contoured surfaces 64 may be provided to vary the speed of the gas over the projectile 26, as desired. The operation of the wind-tunnel simulator is the same with the fixture 12a as was explained with the fixture 12.

While only a few particular embodiments of the novel wind-tunnel simulator have been described herein, it will be understood that the invention is not limited thereto since many modifications may be made without departing from the true spirit and scope of the invention. For example, while the motor 14 has been described and illustrated as an electric motor, it is within the contemplation of this invention to use an air-turbine spinner. Also, the novel wind-tunnel simulator may be used for observing stationary objects, other than spinning pyrotechnic projectiles, under simulated in-flight conditions in different gaseous environments. Hence, it is contemplated that the appended claims shall cover any such modifications as fall within the spirit and scope of the invention.

What is claimed is:

1. A wind-tunnel simulator for producing, about an object having zero linear velocity, a flow of a gas which simulates the flow of the gas over the object as though the latter were projected through the gas, said simulator comprising:
    a fixture having opposite walls and an inner surface that extends between said opposite walls and defines an opening for receiving said object therein spaced from said inner surface,
    a said opening having opposite ends in said opposite walls, respectively,
    conduit means formed in said fixture and communicating with said opening,
    means to supply said flow of said gas through said conduit means, whereby to direct said gas over said object and through one of said ends of said opening,
    motor means fixed to one of said walls of said fixture, and
    means coupled between said motor means and said object for spinning said object about an axis thereof.

2. A wind-tunnel simulator as described in claim 1 wherein,
    said gas is one chosen from the group consisting of air, oxygen, nitrogen, and mixtures thereof.

3. A wind-tunnel simulator as described in claim 1, wherein,
    said gas is a visible one, whereby it can be observed.

4. A wind-tunnel simulator as described in claim 1, wherein
    said object comprises a projectile having a pyrotechnic mixture disposed to burn away from said one of said ends of said opening, and
    said means to supply said flow of said gas comprises a source of said gas under pressure and means to regulate and to measure the velocity of said flow.

5. A wind-tunnel simulator as described in claim 1, wherein
    said conduit means comprise a plurality of passageways formed in said fixture and disposed transversely to said opening, and
    means are provided to vary the space between said object and said inner wall, whereby to vary the velocity of said flow over said object.

6. A wind-tunnel simulator as described in claim 1, comprising, in addition
    means to vary the speed of said motor, whereby to vary the spinning rpm of said object, and
    means to provide a venturi structure between said object and said inner wall that defines said opening, whereby to provide a gas flow with a speed greater than Mach 1.

7. A wind-tunnel simulator as described in claim 1, wherein
    said gas comprises an aerosol, whereby the flow of said gas over said object can be observed.

* * * * *